US006775437B2

(12) United States Patent
Kazarinov et al.

(10) Patent No.: US 6,775,437 B2
(45) Date of Patent: Aug. 10, 2004

(54) TEMPERATURE COMPENSATED OPTICAL WAVEGUIDE STRUCTURES

(75) Inventors: Rudolf Feodor Kazarinov, Lubbock, TX (US); Nikolai Michael Stelmakh, Lubbock, TX (US)

(73) Assignee: Applied WDM Inc., Lubbock, TX (US)

( * ) Notice: Subject to any disclaimer, the term of this patent is extended or adjusted under 35 U.S.C. 154(b) by 217 days.

(21) Appl. No.: 10/092,242

(22) Filed: Mar. 6, 2002

(65) Prior Publication Data

US 2002/0097961 A1 Jul. 25, 2002

Related U.S. Application Data

(63) Continuation-in-part of application No. 09/616,487, filed on Jul. 14, 2000, now Pat. No. 6,493,487, which is a continuation-in-part of application No. 09/616,816, filed on Jul. 14, 2000, now Pat. No. 6,580,861, which is a continuation-in-part of application No. 09/616,745, filed on Jul. 14, 2000, now Pat. No. 6,618,537.

(51) Int. Cl.[7] ............................. G02B 6/12; G02B 6/34; G02B 6/28
(52) U.S. Cl. ............................. 385/37; 385/14; 385/46; 385/24
(58) Field of Search .............................. 385/14, 24, 25, 385/31, 37, 39, 46

(56) References Cited

U.S. PATENT DOCUMENTS 6,301,409 B1 * 10/2001 Whiteaway et al. .......... 385/37
2001/0033714 A1 * 10/2001 Delisle et al. ................. 385/33

* cited by examiner

Primary Examiner—Hemang Sanghavi
Assistant Examiner—Omar Rojas

(57) ABSTRACT

A folded optical waveguide structure comprises a substrate supporting a waveguide slab. An array of laterally spaced grating waveguides extends from the slab along the substrate to propagate optical signals to and from a reflective surface of a mirror member at an end face of the substrate. A layer of index matching material is located between the ends of the waveguides and the reflective surface. A thermally conductive, e.g. copper, body is interposed between the mirror member and the substrate such that dimensional changes of the thermally conductive body resulting from changes in ambient temperature of the grating array waveguides, tilt the mirror member against the substrate, away from or toward the end face of the substrate. The thermally conductive body is so dimensioned that temperature induced changes in optical path lengths of optical signals propagated along the grating array waveguides are substantially compensated by changes in optical path lengths between the ends of the grating waveguides and the reflecting surface caused by the tilting of the mirror member with respect to the grating waveguides at said end of the substrate.

14 Claims, 1 Drawing Sheet

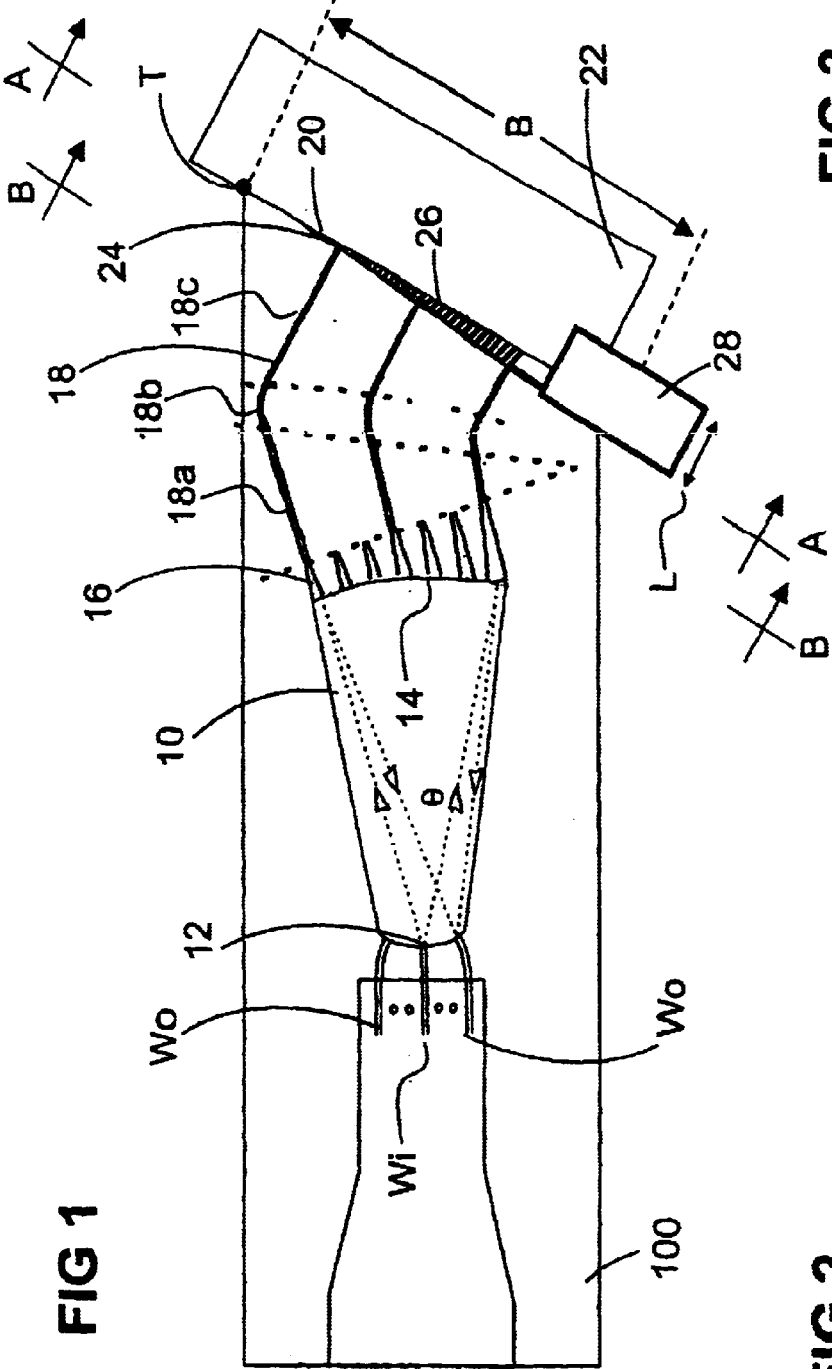
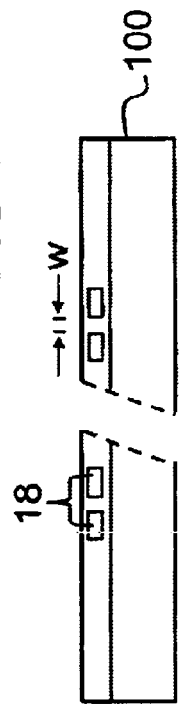
FIG 1
FIG 2
FIG 3

US 6,775,437 B2

TEMPERATURE COMPENSATED OPTICAL WAVEGUIDE STRUCTURES

This application is a continuation in part of each of the following prior applications, application Ser. No. 09/616,487 filed Jul. 14, 2000 (U.S. Pat. No. 6,493,487, issued Dec. 10, 2002), application Ser. No. 09/616,816 filed Jul. 14, 2000 (U.S. Pat. No. 6,580,861, issued Jun. 17, 2003), prior application Ser. No. 09/616,745 filed Jul. 14, 2000 (U.S. Pat. No. 6,618,537 issued Sep. 9, 2003).

FIELD OF THE INVENTION

This invention relates to optical waveguide propagation structures and in particular to such structures incorporating compensation for effects of temperature on operation.

1. Related Applications

The subject matter of the invention disclosed and claimed in this application is particularly suited to employment in conjunction with the optical waveguide transmission device disclosed in copending application Ser. No. 09/616,487 of Henryk Temkin and Rudolf F. Kazarinov, filed Jan. 14, 2000 (U.S. Pat. No. 6,493,487, issued Dec. 10, 2002) and assigned to the assignees of the present application. The disclosure of application Ser. No. 09/616,487 is hereby incorporated by reference into this application as if it had been fully set forth herein.

2. Background of the Invention

It is known that changes in ambient temperature can adversely affect operation of optical waveguide structures, for example wave division multiplexers/demultiplexers. In a particular example, silica based optical waveguide structures employ a doped silicon dioxide core having a higher index of refraction than surrounding silicon dioxide cladding. The effective index of refraction of waveguides changes with ambient temperature, resulting in a spectral shift of the channel wavelengths by about 0.0012 nm per degree C. while the required precision of the channel wavelength is about the same. Thus, it is desirable that the temperature variation during operation of such a waveguide structure should not exceed one degree C.

It has been proposed to use thermoelectric coolers or heaters to reduce ambient temperature variations during operation of such optical waveguide propagation structures. However, such measures have added significantly to overall cost and structural complexity.

Accordingly, there is a recognized need for a simpler and more elegant solution to the problem of reducing adverse effects of temperature on optical waveguide operation, in reducing wavelength changes with temperature of optical signals propagating along optical waveguides, and in particular in optical waveguide grating structures employing a multiplicity of optical waveguides.

SUMMARY OF THE INVENTION

According to the present invention, a folded optical waveguide structure comprises a substrate supporting a waveguide slab and an array of laterally spaced grating waveguides extending from the slab along the substrate to propagate optical signals to and from a reflective surface of a mirror member disposed at an end face of the substrate. A thermally conductive body is interposed between the mirror member and the substrate such that dimensional changes of the body resulting from changes in ambient temperature, tilt the mirror member with respect to the grating waveguides at said end of the substrate. The thermally conductive body is so dimensioned and has a thermal coefficient of expansion such that temperature induced changes in wavelengths of optical signals propagated along the grating array waveguides and reflected from the reflective surface of the mirror member are substantially compensated by the tilting of the mirror member with respect to the grating waveguides at said end of the substrate.

A layer of thermal matching material may be located between the end of the grating waveguide array and the reflective surface, and the tilting of the mirror member changes the optical path lengths between the grating waveguides and the reflective surface of the mirror member to compensate for temperature dependent changes in optical path lengths along the grating waveguides.

Conveniently, the thermally conductive body may be a metal body, for example copper or aluminum, and in one embodiment is supported by the mirror member, for example, mounted in a recess in the mirror member. Alternatively, the thermally conductive body could be mounted by the substrate or partly by both the mirror member and partly by the substrate to permit the required amount of tilt of the mirror member relative to the substrate.

Advantageously, thermally conductive body is laterally offset from one side of the grating array and the mirror member tilts about an axis offset from the opposite side of the waveguide grating array.

BRIEF DESCRIPTION OF THE DRAWINGS

FIG. 1 depicts a top plan view of an optical waveguide multiplexer/demultiplexer embodying the invention;

FIG. 2 is a view along the line A—A in FIG. 1; and

FIG. 3 is a section along the line B—B in FIG. 1.

DETAILED DESCRIPTION OF EMBODIMENTS OF THE INVENTION

FIG. 1 depicts a folded optical waveguide structure embodying the invention and which comprises an input-output optical waveguide structure A; a free space propagation region B; and a reflective (or folded) optical waveguide array grating C, including a continuous reflecting surface of a mirror member. As will be described, the waveguide structure A, free space region B and optical waveguide grating array C are all fabricated on a semiconductor (e.g. silicon) substrate 100.

The input-output waveguide structure A includes an input optical waveguide Wi and a number (typically 16–40) of output optical waveguides Wo spaced apart on either side of the waveguide Wi which may be located at or near the center of the array of output waveguides Wo. In a particular application, assuming an optical amplifier total bandwidth of about 32 nm and a channel separation of 0.8 nm (100 GHz), up to forty channels could be accommodated. The waveguides Wi and Wo interface with and extend radially from an arcuate first end surface 12 of a slab waveguide structure 10 which provides the free space region B. The waveguides Wi and Wo provide ports for communicating light waves to and from the slab waveguide 10. Typically, the output waveguides Wo are symmetrically arranged on both sides of the input waveguide Wi, but this not essential. Alternatively the input waveguide Wi can be located at the either edge of the array of output waveguides. At the interface with the surface 12 (interface arc I), all of these waveguides must extend perpendicularly to this arc. The waveguides Wi, Wo then fan out from the arcuate surface 12 to provide convenient couplings to an input/output optical coupler OC.

The slab waveguide 10 has a second arcuate end surface 14, disposed opposite from the first end surface 12. The second arcuate surface 14 interfaces with a larger number, n, of laterally spaced optical waveguide sections 18 which extend as an array of n laterally spaced apart waveguide sections 18, each of which terminates at a continuous reflector surface 20, conveniently fabricated as a multilevel dielectric deposited on a polished glass surface forming a mirror member 22. There might be about 4 to 8 times as many grating waveguides as there are channels; for example in a 40-channel design, 300>=n>=150, with n=200 being a representative design choice. The grating waveguides interface with the arcuate surface 14 via tapered sections 16 which have wider ends at the interface with the arcuate surface 14. At the interface between the wider ends of the tapered sections 16 and the slab end surface 14, light is confined within the tapered sections and throughout the lengths of the respective tapers, there is essentially no optical coupling between them.

The optical grating waveguides 18 include straight portions 18a, having essentially the same width as each other and different lengths. The waveguides 18 also include curved portions 18b which have different radii of curvature with the greatest radius of curvature associated with the center waveguide 18 (i.e. on each side of the center waveguide 18, there is an equal number of waveguides). Portions 18c of the waveguides 18 extend from and tangentially to the curved portions 18b, each terminating at the reflector surface 20.

A set of multiplexed optical signals, having different individual wavelengths, communicated to the input waveguide Wi are diffracted as they travel across the free space region provided by the waveguide slab 10, and are then communicated along the respective optically isolated grating waveguides 18, reflected from the reflector surface 20, returned along the grating waveguides 18 to the waveguide slab surface 14 and are then propagated to the arcuate surface 12 in respective channels as demultiplexed optical signals to illuminate respective ones of the output optical waveguides Wo, which may be connected by the input/output coupler OC directly or via other networks to appropriate receivers. Conversely, individual single wavelength optical signals could be fed as channel inputs to the respective waveguides Wo and after propagation to and from the reflector surface 20, along the slab waveguide 10 and optical grating waveguide structure 18, emerge at the waveguide Wi as a multiplexed set of optical signals.

The waveguide sections Wi, Wo, the slab waveguide 10, and the grating waveguides 18 conveniently may be constructed as an integrated structure comprising a substrate 100 on which has been formed a dielectric waveguide arrangement, generally indicated 11, comprising a propagation core of high refractive index (conveniently about 1.45) material sandwiched between cladding layers of lower refractive index material. The difference in refractive index (hereafter sometimes referred to simply as 'index') between the core and cladding materials is typically about 0.01 or about 0.5 to 0.7%. In one embodiment, a silicon substrate 100 may be used with silica based core and cladding layers, the core layer (e.g. phosphorous doped silicon dioxide) having a suitably higher index of refraction than the surrounding (doped or undoped silicon dioxide) cladding layer material. Alternatively, semiconductor heterostructures could be used employing, for example a core layer of indium/gallium phosphide and cladding layers of indium phosphide.

Light waves transmitted across the slab waveguide 10 are propagated in two dimensions with light signals confined essentially in the core layer of the dielectric waveguide, which extends over the substrate as a continuous layer 11, the vertical dimension (thickness) of which (perpendicular to the plane of FIG. 1) is such that single mode waveguide transmission of light waves is assured. Using a silica-on-silicon slab waveguide structure, this dimension is typically about 5 microns. In the device described here light waves enter the slab region 10 through the input waveguide Wi. The light waves then expand radially, in the lateral dimension, due to diffraction, and couple to the tapered waveguide sections 16 and the grating waveguides 18 of the waveguide grating section C, defined by laterally spaced apart, equal width, strips of the core material covered by cladding material. Based on a silica-on-silicon waveguide structure, the center-to-center distance between the grating waveguides is preferably greater than 25 microns. The interface between the input-output waveguide structure Wi, Wo and the slab waveguide end surface 12 (interface arc I), as well as the interface between the slab waveguide end surface 14 and the tapered waveguide sections 16, (interface arc II), each form an arc of a circle with the center of the interface arc I located on the interface arc II, and vice versa.

As described above, the reflector surface 20 may be provided on a polished surface of a mirror member 22 extending along an end face 24 of the substrate 100. The mirror member is mounted (e.g. by a mechanical spring mounting, not shown) on the substrate 100 against the free (distal) ends of the grating waveguides 18. A layer 26 of a material with index of refraction matching that of waveguides, suitably in gel form, is located between the reflector surface 20 and the end face 24 of the substrate, to avoid reflection at the surface 24. A suitable material is commercially available under the brand name TAI.

Neighboring grating waveguides 18 are separated by an essentially constant distance w at the end face 24 of the substrate 100 and are designed to differ by a constant increment (D1) in optical path length. The waveguide optical path length is measured as the integral of the waveguide effective refractive index over the length of an overall waveguide 18. However, the total optical path P is measured as the integral of refractive index extended across the layer 26 up to the reflector surface 20.

Typically, the mirror member has a rectangular periphery and the reflector surface 20 extends alongside the end face 24 beyond the opposite lateral sides of the waveguide grating array. At one end, the surface of the mirror member 22 facing the end face 24 of the substrate 100 is recessed and a block 28 of material having temperature coefficient of expansion higher than that of mirror member 22 (e.g. a high thermally conductive metal, suitably copper or aluminum, or a temperature stable plastics material having similar characteristics) is located in the recess to abut the end face 24 of the substrate 100. The block 28 is shown as projecting beyond the lower (as seen in FIG. 1) end of the mirror member 22 but this is not essential and would depend partly on the physical characteristics and dimensioning of the mirror member 22 . The block 28 is secured to the mirror member, for example by epoxy.

At the lowest design operating temperature, the face of the mirror member 22 rests against the end face 24 of the substrate 100, so that the end face 24 and the reflector surface 20 are parallel to each other.

In the grating waveguides 18, the channel wavelengths depend on D, the increment of total optical path P (defined above) between adjacent grating waveguides. Independence of channel wavelengths on device operating temperature requires D to be independent of temperature over the anticipated operating temperature range, which may be about 25° C.+/−20° C. D consists of two parts: $D_1$=the waveguide optical path increment, and $D_2$=the difference of the distances between the reflective surface 20 and the centers of two adjacent grating waveguides 18 at the end face 24 of the substrate 100, multiplied by the index of refraction of the material 26 ($D=D_1+D_2$).

In operation of the folded optical waveguide structure depicted in FIG. 1, changes in ambient temperature cause changes in the index of refraction of the waveguides 18 comprising the waveguide grating array and, therefore, cause changes in the waveguide optical path increment $D_1$. In turn, this results in changes in channel wavelengths caused by change of $D_1$.

In the structure depicted in FIG. 1, such ambient temperature variations also cause expansion or contraction of the dimensions of the block 28, thereby slightly tilting the mirror member 22 against the substrate 100 about an axis T, perpendicular to the surface of the substrate 100 on which the grating waveguides are disposed (i.e. perpendicular to the plane of the waveguide grating array), at the upper (as seen in FIG. 1) end of the mirror member 22. Thus, increasing ambient temperature causes the mirror member to tilt anticlockwise (indicated in an exaggerated manner in FIG. 1) and decreasing ambient temperature causes the mirror member to tilt clockwise. These variations of the tilt cause variations of $D_2$, a part of the increment of the total optical path D, related to propagation of light between surfaces 24 and 20.

By appropriate selection of the length L of the block 28 between the substrate end face 24 and the bottom of the recess in the mirror member in which the block is located, in conjunction with difference in the temperature coefficients of expansion of the block 28 and of the mirror member 22 variation of $D_1$ with temperature is compensated by variation of $D_2$. Thus, $D=D_1+D_2$ is temperature independent. Under this condition channel wavelengths in the grating waveguides 18 do not depend on temperature, thereby providing athermal operation of the device.

In a particular embodiment of a structure as depicted in FIG. 1, a silicon substrate and a silica based core/cladding structure was employed, in which the length increment $D_1$ between adjacent waveguides 18 is 12.38 $\mu$m and the lateral separation w=28 $\mu$m. The derivative dn/dT of the refractive index of the grating waveguides with respect to temperature is 1.1E-5 per degree C. The mirror member 22 is constructed of fused silica having a thermal coefficient of expansion of 0.5E-6/° C., and the interposed index matching material 26 has an index of refraction of 1.45. The thermally conductive block is copper having a dimension L of 2.24 mm and the distance B, between the center of the thermally conductive block 28 and the pivot point T, is 2 cm.

Instead of mounting the thermally conductive block 28 to the mirror member 22, it could be mounted in a recess in the substrate 100 or accommodated partly by the mirror member 22 and partly by the substrate 100. Also, mounting mechanisms other than mechanical spring mountings (e.g. plastic molding) could be used to mount the assembly comprised of the tilting mirror member 22 and thermally conductive block 28 to the substrate 100.

What is claimed is:

1. A folded optical waveguide structure comprising a substrate supporting a waveguide slab and an array of laterally spaced grating waveguides extending from the slab along the substrate to propagate optical signals to and from a reflective surface of a mirror member disposed at an end of the substrate; and a thermally conductive body interposed between the mirror member and the substrate, the thermally conductive body being so dimensioned and having a thermal coefficient of expansion such that temperature induced changes in wavelengths of said optical signals propagated along the grating array waveguides and reflected from the reflective surface of the mirror member, including wavelength changes resulting from the thermal coefficient of expansion of said mirror member, are substantially compensated by dimensional changes of the body tilting the mirror member with respect to the grating waveguides at said end of the substrate.

2. A folded optical waveguide structure according to claim 1, wherein said temperature induced changes in wavelengths include changes resulting from changes in the index of refraction of said waveguide gratings.

3. A folded optical waveguide structure according to claim 1, wherein the thermally conductive body is supported by the mirror member.

4. A folded optical waveguide structure according to claim 1, wherein the thermally conductive body is a metal body.

5. A folded optical waveguide structure according to claim 1, wherein the thermally conductive body comprises copper or aluminum.

6. A folded optical waveguide structure according to claim 1, wherein the reflective surface comprises a coating on a glass support member.

7. A folded optical waveguide structure comprising a substrate supporting a waveguide slab and an array of laterally spaced grating waveguides extending from the slab along the substrate to propagate optical signals to and from a reflective surface of a mirror member disposed at an end of the substrate; and a thermally conductive body is mounted in a recess in and supported by the mirror member such that the thermally conductive body is interposed between the mirror member and the substrate, the thermally conductive body being so dimensioned and having a thermal coefficient of expansion such that temperature induced changes in wavelengths of said optical signals propagated along the grating array waveguides and reflected from the reflective surface of the mirror member are substantially compensated by dimensional changes of the body tilting the mirror member with respect to the grating waveguides at said end of the substrate.

8. A folded optical waveguide structure according to claim 7, wherein said temperature induced changes in wavelengths include changes resulting from the thermal coefficient of expansion of said mirror member.

9. A folded optical waveguide structure according to claim 7, including a layer of refractive index matching material between the end of the grating waveguide array and the reflective surface, and wherein said tilting of the mirror member changes the optical path lengths between the grating waveguides and the reflective surface of the mirror member.

10. A folded optical waveguide structure comprising a substrate supporting a waveguide slab and an array of laterally spaced grating waveguides extending from the slab along the substrate to propagate optical signals to and from a reflective surface of a mirror member disposed at an end of the substrate; and a thermally conductive body interposed between the mirror member and the substrate, the thermally conductive body being so dimensioned and having a thermal coefficient of expansion such that temperature induced changes in wavelengths of said optical signals propagated along the grating array waveguides and reflected from the reflective surface of the mirror member are substantially compensated by dimensional changes of the body tilting the mirror member with respect to the grating waveguides at said end of the substrate;

wherein the thermally conductive body is laterally offset from one side of the grating array and the mirror member tilts about an axis offset from the opposite side of the grating array.

11. A folded optical waveguide structure comprising a substrate supporting a waveguide slab and an array of laterally spaced grating waveguides extending from the slab along the substrate to propagate optical signals to and from a reflective surface of a mirror member disposed at an end of the substrate; and a thermally conductive body interposed between the mirror member and the substrate, the thermally conductive body being so dimensioned and having a thermal coefficient of expansion such that temperature induced charges in wavelengths of said optical signals at the interface between the grating waveguides and the reflecting surface of the mirror member are substantially compensated by dimensional changes of the body tilting the mirror with respect to the substrate to change optical path lengths between the grating waveguides and the reflecting surface;

wherein the thermally conductive body is laterally offset from one side of the grating array and the mirror member tilts about an axis offset from the opposite side of the grating array.

12. A folded optical waveguide structure according to claim 11, including a layer of refractive index matching material between the end of the grating waveguide array and the reflective surface, and wherein said tilting of the mirror member changes the optical path lengths between the grating waveguides and the reflective surface of the mirror member.

13. A folded optical waveguide structure comprising a semiconductor substrate supporting a waveguide slab and an optical grating comprising laterally spaced waveguides extending from the slab along the substrate, terminating at one end face of the substrate at a reflective surface of a mirror member, such that optical signals propagated along the grating waveguides to the reflective surface are reflected and returned along the same respective waveguides; and a thermally conductive body mounted in a recess in the mirror member to project beyond the mirror member and abut the end face of the substrate, the thermally conductive body being laterally offset from the optical grating waveguides, the thermally conductive body having a thermal coefficient of expansion and being so dimensioned and positioned relative to the substrate that changes in ambient temperature cause dimensional changes in the thermally conductive body effective to tilt the mirror member away from or towards the substrate thereby to change optical path lengths between the grating waveguides and the reflecting surface to substantially compensate thermally induced changes in wavelengths of optical signals propagating along the grating waveguides.

14. A folded optical waveguide structure according to claim 13, including a layer of refractive index matching material between the end of the grating waveguide array and the reflective surface, and wherein said tilting of the mirror member changes the optical path lengths between the grating waveguides and the reflective surface of the mirror member.

* * * * *